US011561929B2

(12) United States Patent
Zhao et al.

(10) Patent No.: US 11,561,929 B2
(45) Date of Patent: Jan. 24, 2023

(54) METHOD, DEVICE AND COMPUTER PROGRAM PRODUCT FOR SHRINKING STORAGE SPACE

(71) Applicant: EMC IP Holding Company LLC, Hopkinton, MA (US)

(72) Inventors: Chaojun Zhao, Chengdu (CN); Hongyuan Zeng, Sichuan (CN); Shuangshuang Liang, Zunyi Ci (CN); Kai Li, Chengdu (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 346 days.

(21) Appl. No.: 16/883,029

(22) Filed: May 26, 2020

(65) Prior Publication Data

US 2021/0117378 A1  Apr. 22, 2021

(30) Foreign Application Priority Data

Oct. 21, 2019  (CN) ......................... 201911002080.3

(51) Int. Cl.
| | |
|---|---|
| *G06F 16/11* | (2019.01) |
| *G06F 16/16* | (2019.01) |
| *G06F 16/182* | (2019.01) |
| *G06F 16/17* | (2019.01) |
| *G06F 9/50* | (2006.01) |
| *G06F 3/06* | (2006.01) |

(52) U.S. Cl.
CPC ............ *G06F 16/128* (2019.01); *G06F 3/067* (2013.01); *G06F 3/0608* (2013.01); *G06F 3/0644* (2013.01); *G06F 9/5016* (2013.01); *G06F 16/125* (2019.01); *G06F 16/162* (2019.01); *G06F 16/1734* (2019.01); *G06F 16/1824* (2019.01); *G06F 2209/5011* (2013.01)

(58) Field of Classification Search
CPC .. G06F 16/125; G06F 16/1824; G06F 16/128; G06F 16/162; G06F 16/1734
USPC .......................................................... 707/822
See application file for complete search history.

(56) References Cited

U.S. PATENT DOCUMENTS

| | | | |
|---|---|---|---|
| 5,802,599 A * | 9/1998 | Cabrera | ................ G06F 3/0611 711/170 |
| 8,250,327 B2 * | 8/2012 | Fujii | ..................... G06F 3/0614 711/170 |
| 8,521,987 B2 | 8/2013 | Iwamitsu et al. | |
| 9,383,924 B1 | 7/2016 | Fullbright et al. | |
| 10,346,057 B1 * | 7/2019 | Martin | .................. G06F 3/0665 |
| 10,678,456 B2 | 6/2020 | Chen et al. | |
| 11,023,128 B2 | 6/2021 | Pabon | |

(Continued)

*Primary Examiner* — Shahid A Alam
(74) *Attorney, Agent, or Firm* — BainwoodHuang

(57) ABSTRACT

Techniques for shrinking a storage space involve determining a used storage space in a storage pool allocated to a plurality of file systems, and determining a usage level of a storage space in the storage pool based on the used storage space in and a storage capacity of the storage pool. The techniques further involve shrinking a storage space from one or more of the plurality of file systems based on the usage level of the storage pool. Such techniques may automatically shrink storage space in one or more file systems from the global level of the storage pool, which determines an auto shrink strategy according to overall performance of the storage pool, thereby improving efficiency of auto shrink and balancing system performance and saving space.

21 Claims, 4 Drawing Sheets

(56) References Cited

U.S. PATENT DOCUMENTS

| | | | |
|---|---|---|---|
| 11,188,462 B2* | 11/2021 | Huang | G06F 12/063 |
| 2012/0323970 A1* | 12/2012 | Larson | G06F 16/9014 |
| | | | 707/800 |
| 2017/0242611 A1* | 8/2017 | Callahan | G06F 16/1727 |
| 2020/0133551 A1* | 4/2020 | Jiang | G06F 3/0631 |

* cited by examiner

METHOD, DEVICE AND COMPUTER PROGRAM PRODUCT FOR SHRINKING STORAGE SPACE

CROSS-REFERENCE TO RELATED APPLICATION

This application claims priority to Chinese Patent Application No. CN201911002080.3 on file at the China National Intellectual Property Administration (CNIPA), having a filing date of Oct. 21, 2019, and having "METHOD, DEVICE AND COMPUTER PROGRAM PRODUCT FOR SHRINKING STORAGE SPACE" as a title, the contents and teachings of which are herein incorporated by reference in their entirety.

FIELD

Embodiments of the present disclosure generally relate to the field of data storage, and more specifically, to a method, a device and a computer program product for shrinking a storage space.

BACKGROUND

A file system refers to a system that stores and manages files. Generally, from a system perspective, a file system organizes and allocates space on file storage devices, is responsible for storing files and protects and retrieves the stored files. Specifically, it is responsible for creating files for users, writing, reading, modifying, dumping files, controlling file access, and revoking files when users no longer use them. Generally speaking, a plurality of file systems may share a same storage pool which includes a certain amount of storage resources, e.g., disks.

Shrinking is to return a part of unused space that has been allocated to a file system to a storage pool. In order to make storage products more competitive in a storage market, the cost per unit of storage space needs to be reduced. Shrinking a storage space of a file system for usage by other file systems and/or a logic unit number (LUN) is one important way to achieve this goal. Auto shrink of a file system has been in use in the next generation file system (NGFS), and is an important space management feature in current storage products. The auto shrink of the NGFS file system is an internal background process which does not notify users. Generally speaking, a threshold and duration are set to start an auto shrink, and it is possible to check the status of the file system periodically, to determine whether an auto shrink should be triggered.

SUMMARY

Embodiments of the present disclosure provide a method, a device and a computer program product for shrinking a storage space.

In an aspect of the present application, there is provided a method for shrinking a storage space. The method includes determining a used storage space in a storage pool allocated to a plurality of file systems; determining a usage level of a storage space in the storage pool based on the used storage space and a storage capacity of the storage pool; and shrinking a storage space from one or more file systems of the plurality of file systems based on the usage level of the storage pool.

In another aspect of the present application, there is provided an electronic device. The device includes a processing unit and a memory coupled to the processing unit and storing instructions, the instructions, when executed by the processing unit, causing the device to perform actions including: determining a used storage space in a storage pool allocated to a plurality of file systems; determining a usage level of a storage space in the storage pool based on the used storage space and a storage capacity of the storage pool; and shrinking a storage space from one or more of the plurality of file systems based on the usage level of the storage pool.

In a further aspect of the present application, there is provided a computer program product being tangibly stored on a non-transitory computer-readable medium and including machine-executable instructions that, when executed, cause a machine to perform the method or process according to the embodiments of the present disclosure.

The Summary of the invention is provided to introduce a selection of concepts in a simplified form, which are further described in the Detailed Description. The Summary is neither intended to identify key features or essential features of the present disclosure nor to limit the scope of the present invention.

BRIEF DESCRIPTION OF THE DRAWINGS

Through the following detailed description with reference to the accompanying drawings, the above and other objectives, features, and advantages of example embodiments of the present disclosure will become more apparent. In the example embodiments of the present disclosure, the same reference numerals generally denote the same components.

DETAILED DESCRIPTION OF EMBODIMENTS

Figure 1:
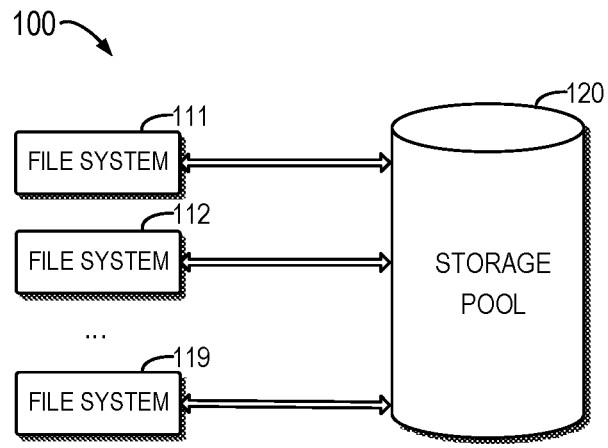
FIG. 1 is a diagram illustrating an example environment of a storage pool according to an embodiment of the present disclosure.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Preferred embodiments of the present disclosure will be described in more detail below with reference to the accompanying drawings. While the preferred embodiment of the present disclosure has been shown in the drawings, it should be understood that the present disclosure may be embodied in various forms and is not limited by the embodiments set forth herein. Rather, the embodiments are provided so that this disclosure will be thorough and complete, and the scope of the disclosure may be fully conveyed to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one example embodiment" and "an example embodiment" are to be read as "at least one example embodiment." The term "another embodiment" is to be understood as "at least one other embodiment." The terms "first," "second," and the like may refer to different or identical objects. Other explicit and implicit definitions may be included below.

Generally, a storage space in a storage pool will be allocated to a plurality of file systems. Traditionally, each file system performs an automatic shrink operation of the storage space according to its own setting. That is, each file system performs a local optimization of storage space shrinking, respectively. Each file system will trigger an auto shrink according to its own threshold size and duration, without considering an overall status of the storage pool of file systems. Normally, the need of auto shrink of storage space for a storage pool whose storage space is about to run out is more urgent than one whose storage space consumption is relatively small.

Generally speaking, the implementation of auto shrink will have a certain impact on performance of a file system. Normally, an auto shrink process of a file system is time consuming as it will consume some internal IOs to reorganize blocks for shrinking storage resources. An additional lock will be used to avoid a conflict with other space management process and host IOs. Further, there will be overheads for metadata update for the auto shrink process as well. Inventors of the present disclosure discovered that a file system is more likely to run into a lock conflict and timing issues during the auto shrink process.

In addition, a shrunk storage space cannot be guaranteed to return to a storage pool. Despite the purpose of the auto shrink of file systems is to return unused allocated space to the storage pool, an actual returned space is impacted by many factors. For example, if there are many different snapshots of the file system, the storage space is only shrunk from the file system, but not returned to the storage pool because of snapshot block sharing and reference. Sometimes, it may even result in an increase of temporary space.

Moreover, in an auto shrink process of storage space of a file system, an auto extension of the file system may occur, which is referred to as a "shaking" scenario. This shaking scenario means that an extension occurs after or even during a shrinking or vice versa in a short time period. Further, the IO speed of a file system might be very quick sometimes (e.g., PBR could possibly reserve a large amount space in one shot). Thus, it causes a potential shaking scenario, thereby resulting in negative impacts on system performance, decreasing the space saving of the auto shrink and increasing the risk of hitting DU issues.

To this end, the embodiments of the present disclosure propose a new scheme for managing auto shrink of a file system, which is an adaptive file system auto shrink management scheme, which can balance large space saving and small performance impacts. The inventor of the present disclosure found that performing an auto shrink function will not have an impact on performance of host TO, and cannot guarantee that a storage space is shrunk to the storage pool, and increases the risk of DU problems, therefore it is not that the more auto shrink operation is run, the better. In addition, embodiments of the present disclosure are able to automatically work in a smarter and efficient mode without user intervention. Furthermore, the embodiments of the present disclosure are easy to implement and have good compatibility.

Embodiments of the present disclosure automatically shrink storage space in one or more file systems from a global level of a storage pool and can determine an auto shrink strategy for storage space according to the overall performance of the storage pool, thereby improving the efficiency of automatic storage space shrink and balancing system performance and space saving. Therefore, the embodiments of the present disclosure can perform an auto shrink of a file system in an intelligent and effective manner, thereby improving the execution efficiency of the storage pool, and meanwhile, without introducing undesired performance impacts and conflict issues.

Basic principles and several example implementations of the present disclosure will be described below with reference to FIGS. 1 to 6. It should be understood that these example embodiments are given only to enable those skilled in the art to better understand and thereby implement the embodiments of the present disclosure, without limiting the scope of the present disclosure in any way.

FIG. 1 is a diagram illustrating an example environment 100 of a storage pool according to an embodiment of the present disclosure. As shown in FIG. 1, the example environment 100 includes a plurality of file systems 111, 112, . . . , 119, and a storage pool 120. The storage pool 120 may be composed of a set of various storage devices (e.g., disks) and its storage space (i.e., storage resources) may be shared by a plurality of file systems 111, 112, . . . , 119. Storage spaces may be allocated from the storage pool 120 to each file system manually or automatically. For example, a storage pool 120 has a storage capacity of 3 TB, in which 150G of storage space is allocated to the file system 111 and the file system 111 has used 100G of storage space. In this example, the allocated storage space in the file system 111 is somewhat leftover, for example, there exists 25G of shrinkable storage space (e.g., for deallocating back to the storage pool). By shrinking storage space from each file system, the storage space in the storage pool 120 is able to be used for more file systems, thereby improving the storage efficiency of the storage pool.

Figure 2:
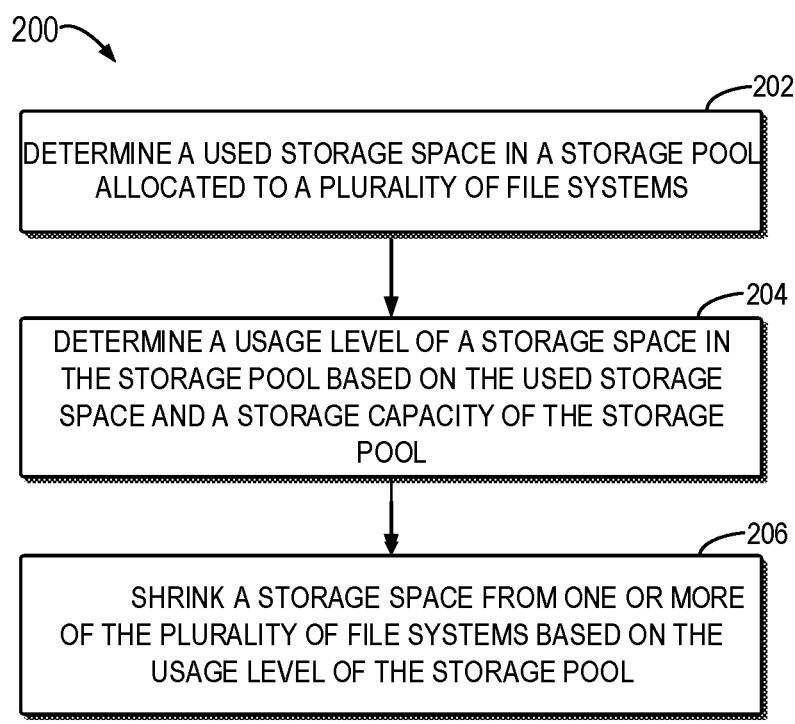
FIG. 2 is a flowchart illustrating a method for automatically shrinking a storage space according to an embodiment of the present disclosure.

FIG. 2 is a flowchart illustrating a method 200 for shrinking storage space according to an embodiment of the present disclosure. To better describe the method 200, it is described with reference to the example environment 100 of FIG. 1.

At 202, a used storage space in a storage pool that has been allocated to a plurality of file systems is determined. For example, the allocated storage space of each file system 111, 112, . . . , 119 may be obtained, and then a sum of the allocated storage space of all file systems is determined. In some embodiments, the allocated storage space on each file system may be obtained periodically and the sum thereof is calculated. In some embodiments, in order to sort all file systems, one or more of a shrinkable space size, the number of snapshots, and a fragment level of each file system may also be collected.

At 204, a used level of the storage space in a storage pool is determined based on the used storage space and a storage capacity of the storage pool. For example, a ratio between a size of the used storage space in the storage pool and a total storage capacity of the storage pool can be determined as a usage rate of storage space of the storage pool.

At 206, the storage space is shrunk from one or more of the plurality of file systems based on the usage level of the storage pool. For example, according to an overall usage rate of storage space of the storage pool, whether to perform auto shrinking of storage space and how to shrink it is specifically determined. Different from a traditional local optimization method for each file system, embodiments of the present disclosure auto shrink a storage space in one or more file systems from a global level of a storage pool, which is a global optimization method. In some embodiments of the present disclosure, when an overall utilization rate of a storage pool is low, there is no need to perform a shrink operation of the storage space of a file system since there is a large amount of available storage space, thereby avoiding an impact on the operational performance of the file system. However, only when an overall utilization rate of a storage pool is high, one or more file systems are selected at a global level for a shrinking storage space, thereby improving the efficiency of shrinking storage space.

Therefore, the method 200 according to the embodiment of the present disclosure can determine an auto shrink strategy for storage space according to an overall performance of a storage pool, thereby improving the efficiency of auto shrink for the storage space, and meanwhile it balances system performance and space saving.

Figure 3:
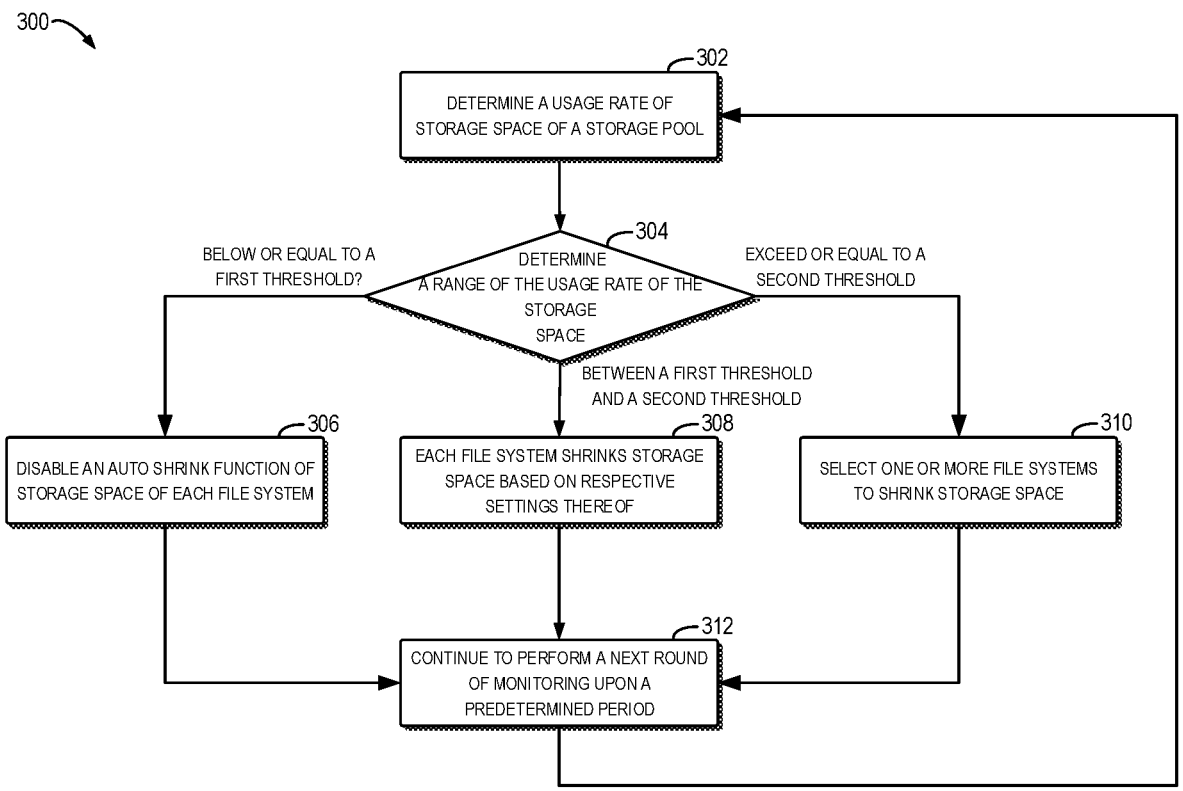
FIG. 3 is a flowchart illustrating a method for determining an auto shrink strategy for a storage pool according to an embodiment of the present disclosure.

FIG. 3 is a flowchart illustrating a method 300 for determining an auto shrink strategy for a storage pool according to an embodiment of the present disclosure. It should be understood that the method 300 may be an example implementation of actions 204-206 in the method 200 described above with reference to FIG. 2.

At 302, a usage rate of storage space of an entire storage pool is determined. The embodiments of the present disclosure implement shrink optimization of storage space from a global level of a storage pool. Therefore, in some embodiments of the present disclosure, an overall usage rate of the storage pool may be divided into three ranges which are low usage rate, medium usage rate, and high usage rate. Then, different storage space auto shrink strategies are selected according to different scopes. In the scenario of low usage ratio, there is no need to shrink storage space for each file system. In a scenario of medium usage rate, each file system may perform space shrink according to its respective shrink strategy. In a scenario of high usage rate, one or more file systems may be selected from the overall level of the storage pool for storage space shrink. In some embodiments, a first threshold (i.e., a low flag) and a second threshold (i.e., a high flag) are used to distinguish the three ranges of usage rate, for example, the first threshold may be set to 50%, and the second threshold may be set to 75%, of course, the first and second thresholds may also be other values.

At 304, a range of the usage rate of storage space is determined. If the usage rate of storage space of the storage pool is below or equals to the first threshold (i.e., a scenario of low usage rate), it means that there is enough available space in the storage pool, so there is no need to automatically shrink any file system. Since auto shrink of file system is an internal activity unknown to users, disabling the auto shrink function of file system may be chosen when the storage space is sufficient. At 306, the auto shrink function of storage space of each file system is disabled. Performance impacts and DU risks may be avoided by disabling the auto shrink function of a file system.

At 304, if it is determined that the usage rate of storage space of the storage pool is between the first and second thresholds (i.e., a scenario of medium usage rate), then at 308, each file system shrinks storage space according to its own setting. For example, each file system determines whether its idle rate exceeds a certain threshold, and if the idle rate exceeds the certain threshold, a part of the free storage space in the file system is shrunk to the storage pool. In a scenario of medium usage rate, when an idle storage space which is unused and has been allocated is returned to the storage pool, a value of auto shrink of file system is added. In this scenario, a threshold and duration may be set by a file system to start auto shrink for each file system independently.

At 304, if it is determined that the usage rate of storage space of the storage pool exceeds the second threshold (i.e., a scenario of high usage rate), then at 310, one or more file systems are selected from a plurality of file systems for shrinking storage space. The scenario of high usage rate means the available space of the storage pool is limited, and customers are currently sensitive to space. Therefore, a more aggressive way will be used to trigger auto shrink of file system for shrinking spare space in the file system.

Figure 4:
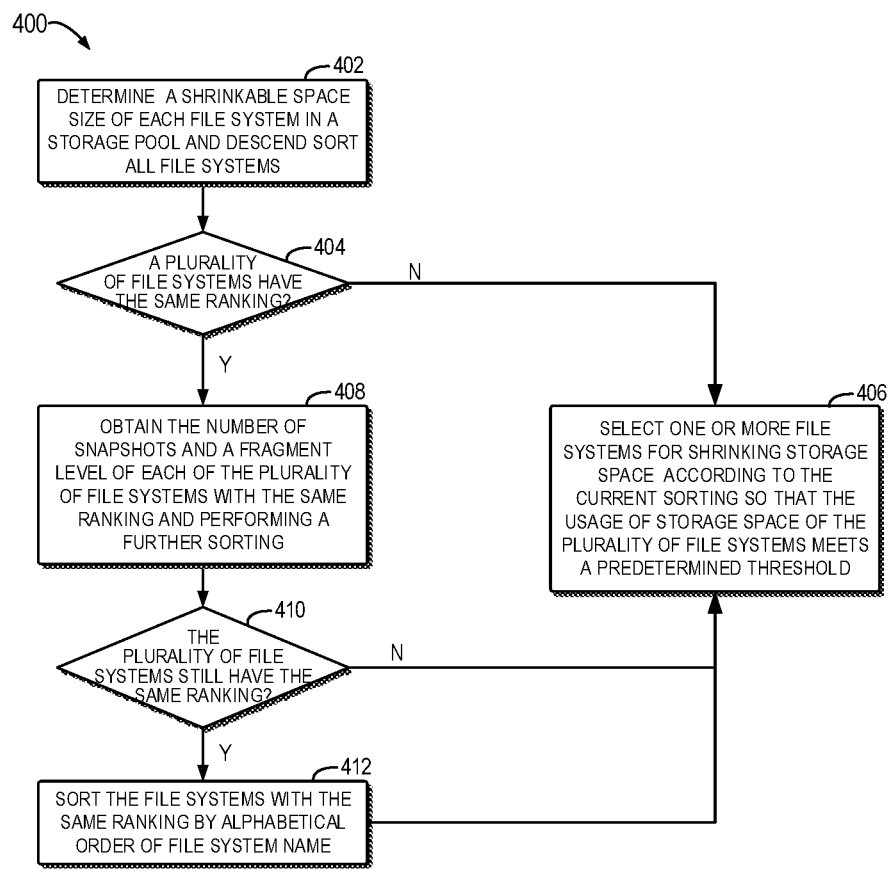
FIG. 4 is a flowchart illustrating a method for selecting one or more from a plurality of file systems for shrinking storage space according to an embodiment of the present disclosure.

Through extensive researching and tests, the inventor of the present disclosure found that a speed auto shrink of file system, efficiency of space shrink and impact on system performance are closely related to the size of shrinkable space, the number of snapshots, and a fragment level of each file system. The larger the shrinkable space of a file system, the more space is possible to be shrunk into the storage pool. The more snapshots of a file system, the more blocks are referenced by different inodes; the less space would be shrunk to the storage pool. The more fragments of a file system, the less continuous blocks are in a file system, which requires more internal IOs and more time to find a free window to do blocks relocation for auto shrink. With reference to FIG. 4, an example implementation of a method of selecting the most appropriate file system from a set of file systems is described, for performing auto shrink to obtain more space, and meanwhile having less impact on performance and low risk of hitting DU issue.

At 312, a next round of monitoring will continue for a predetermined period. For example, a storage space status is monitored once every 1.5 hour according to some embodiments of the present disclosure. As a result, different storage space shrink strategies are selected for different usage scenarios based on the overall usage of the storage pool according to the embodiments of the present disclosure, which can balance usage of storage space and performance impact well, thereby improving storage efficiency.

FIG. 4 is a flowchart illustrating a method 400 for selecting one or more file systems for storage space shrink from a plurality of file systems according to an embodiment of the present disclosure. It should be understood that the method 400 may be an example implementation of the action 310 in the method 300 described above with reference to FIG. 3.

Before describing the method 400, some concepts in some embodiments of the present disclosure are defined:

$P_{usage\ level}$ represents current usage rate of storage space of a memory, which equals to used space of storage pool/capacity of storage pool;

$P_{fs\ usage}$ represents (used space of all file systems)/(allocated space of all file systems) in a storage pool;

LWM represents a low water mark of usage rate of storage pool, i.e., the first threshold as above, and for example, its default value may be 50%;

HWM represents a high water mark of usage rate of storage pool, i.e., the second threshold, and for example, its default value may be 75%;

n represents the total number of file systems in a storage pool;

$US_i$ represents the used space of file system i;

$AS_i$ represents the allocated space of file system i;

$Shrk_i$ represents the size of shrinkable space of file system i.

$Snap_i$ represents the number of snapshots of file system i.

$Frag_i$ represents the fragment level of file system i.

$X_{shrink}$ represents the number of the unique shrinkable size of all file systems in this storage pool, wherein $1 \leq X_{shrink} \leq n$;

$X_{ishrink}$ represents file system i is the number $X_{ishrink}$ unique shrinkable size by ascending sorting order in this storage pool;

$V_{isize}$ represents the normalized value of shrinkable size of file system i, and its value equals to $X_{ishrink}/X_{shrink}$;

$X_{snap}$ represents the number of the unique snapshot counts of all file systems in this storage pool, where $1 \leq X_{snap} \leq n$;

$X_{isnap}$ represents file system i is the number $X_{isnap}$ unique snapshot count by descending sorting in this storage pool;

$V_{isnap}$ represents the normalized value of user and system snapshot count of file system i, and its value equals to $X_{isnap}/X_{snap}$;

$X_{frag}$ represents the number of the unique fragment of all file systems in this storage pool, where $1 \leq X_{frag} \leq n$;

$X_{ifrag}$ represents file system i is the number $X_{ifrag}$ unique fragment by descending sorting in this storage pool;

$V_{ifrag}$ represents the normalized value of fragment of file system i, and its value is equal to $X_{ifrag}/X_{frag}$;

$P_i$ represents punishment is performed if auto shrink is cancelled for file system i, and its initial value $P_i=1$.

Storage efficiency of storage pool may be determined by $P_{usage\ level}$, i.e., a ratio between the used space of storage pool and the capacity of the storage pool. Three different scenarios are defined according to some embodiments of the present disclosure, which are: $P_{usage\ level}$ is below LWM, $P_{usage\ level}$ is between LWM and HWM and $P_{usage\ level}$ exceeds or equals to HWM, to balance the storage efficiency and storage performance. For example, a file system auto shrink manager will monitor the storage pool space status once every 1.5 hour. In addition, the file system auto shrink manager will start a watchdog to monitor and record the $V_{isize}$, $V_{isnap}$, $V_{ifrag}$ for each file system every 2 minutes in background once a storage pool is created When $P_{usage\ level}$ is below or equals to LWM, the storage pool is in the scenario of low usage rate. In this scenario, it is considered that there is enough space in this storage pool. Storage system will disable auto shrink for all file systems in this storage pool, which is a preferred performance mode.

When $P_{usage\ level}$ exceeds LWM and is below HWM, the storage pool is in the scenario of medium usage rate. In this scenario, each system may manage auto shrink respectively. For example, a ratio between the actual number of free blocks and the maximum number of free blocks is checked for every file system every 1.5H, and only when the ratio exceeds a threshold five times in a row, an auto shrink function is performed.

When $P_{usage\ level}$ exceeds or is equal to HWM, the storage pool is in the scenario of high usage rate. In this scenario, a user is more sensitive to the storage space of the storage pool. It is critical to shrink the unused allocated file system space for use in other ways, which is a space-saving preferred mode. As such, the auto shrink of file system will be triggered more aggressively to shrink available space so as to reduce the overhead in this storage pool. FIG. 4 illustrates an example process of shrinking storage space from a file system in a scenario of high usage rate.

At 402, the shrinkable space size $Shrk_i$ of each of the plurality of file systems is determined and all file systems are sorted in descending order in the storage pool based on the $V_{isize}/P_i$. At 404, it is determined whether there are a plurality of file systems in the sorting having the same ranking, that is, the plurality of file systems have equal $V_{isize}/P_i$ values. If not, the ranking of each file system is different. At 406, according to the current sorting, one or more file systems is selected to perform storage space shrink, so that the storage space usage rate of a plurality of file systems meets a predetermined threshold, for example, causing $P_{fs\ usage} \geq 70\%$ after auto shrink.

If the determination is yes at 404, a plurality of file systems is ranked the same. At 408, for the plurality of file systems with the same rank, the number of snapshots $Snap_i$ and the fragment level $F_{ragi}$ of each file system are obtained, and $(V_{isnap}+V_{ifrag})/P_i$ is used to further sort these file systems.

At 410, it is further determined whether there is still a plurality of file systems having the same ranking in the sorting. If yes, at 412, these file systems with the same ranking are sorted by alphabetical order of file system name, and then action 406 is performed according to the sort. If it is determined as no at 410, action 406 is performed directly.

Figure 5:
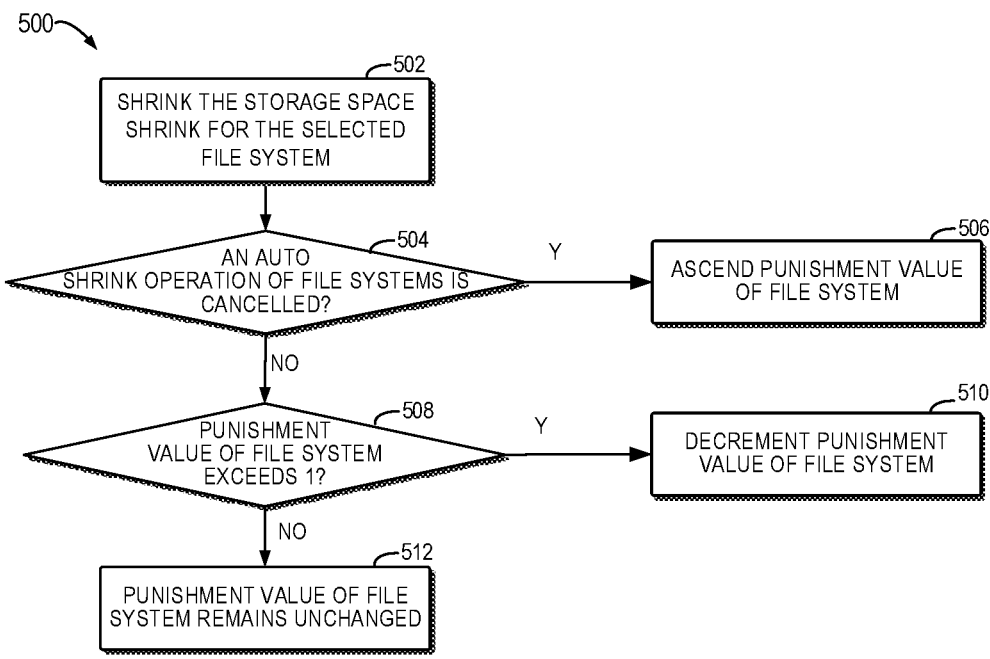
FIG. 5 is a flowchart illustrating a method for processing a scenario of cancelling an auto shrink according to some embodiments of the present disclosure.

FIG. 5 is a flowchart illustrating a method 500 for processing a scenario of auto shrink being cancelled according to some embodiments of the present disclosure. The method 500 of FIG. 5 may be used to update a punishment value $P_i$ in some embodiments of the present disclosure.

At 502, storage space shrink is performed for the selected file system. At 504, it is determined whether the auto shrink of the file system is cancelled. For example, if conflicting operations such as automatic expansion or manual expansion occur during the process of auto shrink, then the current auto shrink will be cancelled.

If it is determined at 504 that the auto shrink of file system i is cancelled, then at 506, the punishment value $P_i$ of a certain file system i is incremented. If it is determined at 504 that the auto shrink of a certain file system i is not cancelled, then at 508, it is further determined whether the punishment value $P_i$ of the file system i exceeds 1, and if $P_i$ exceeds 1, then the punishment value of the file system is decremented at 510. If $P_i$ is below 1, then the punishment value $P_i$ of file system i is maintained at 512. After the adjustment of the punishment value $P_i$ is completed, it will wait for a period of time for next monitoring.

Two examples of shrinking storage space from a file system to a storage pool in a scenario of high usage rate are shown according to methods 400 and 500 of embodiments of the present disclosure.

Example 1

Users create a storage pool of 3 TB and allocate the storage space of the storage pool to 10 file systems. At a certain time t=3H, some parameter values of the storage pool are as shown in Table 1 below and some parameter values of the file systems are as shown in Table 2 below:

TABLE 1

| Parameter Values of Storage Pools at t = 3 H | | | |
|---|---|---|---|
| PID | $P_{usage\ level}$ | $P_{fs\ usage}$ | n |
| pool_1 | 75.0% | 67.1% | 10 |

TABLE 2

Parameter Values of File systems at t = 3 H

| FS | $US_i$ | $AS_i$ | $Shrk_i$ | $Snap_i$ | $Frag_i$ | $X_{shrink}$ | $X_{ishrink}$ | $V_{isize}$ | $X_{snap}$ | $X_{isnap}$ | $V_{isnap}$ | $X_{frag}$ | $X_{ifrag}$ | $V_{ifrag}$ | $P_i$ |
|---|---|---|---|---|---|---|---|---|---|---|---|---|---|---|---|
| fs_0 | 100 G | 150 G | 25 G | 5 | 20% | 7 | 2 | 0.29 | 6 | 5 | 0.83 | 10 | 8 | 0.80 | 1 |
| fs_1 | 100 G | 170 G | 40 G | 3 | 15% |   | 5 | 0.71 |   | 6 | 1.00 |   | 10 | 1.00 | 2 |
| fs_2 | 230 G | 350 G | 100 G | 10 | 30% |   | 7 | 1.00 |   | 1 | 0.17 |   | 5 | 0.50 | 1 |
| fs_3 | 100 G | 160 G | 40 G | 3 | 24% |   | 5 | 0.71 |   | 6 | 1.00 |   | 6 | 0.60 | 1 |
| fs_4 | 80 G | 110 G | 20 G | 3 | 60% |   | 1 | 0.14 |   | 6 | 1.00 |   | 1 | 0.10 | 3 |
| fs_5 | 110 G | 150 G | 20 G | 10 | 34% |   | 1 | 0.14 |   | 1 | 0.17 |   | 4 | 0.40 | 1 |
| fs_6 | 170 G | 230 G | 30 G | 6 | 51% |   | 3 | 0.43 |   | 4 | 0.67 |   | 2 | 0.20 | 2 |
| fs_7 | 180 G | 300 G | 80 G | 8 | 23% |   | 6 | 0.86 |   | 3 | 0.50 |   | 7 | 0.70 | 1 |
| fs_8 | 310 G | 450 G | 100 G | 9 | 16% |   | 7 | 1.00 |   | 2 | 0.33 |   | 9 | 0.90 | 1 |
| fs_9 | 130 G | 180 G | 35 G | 5 | 38% |   | 4 | 0.57 |   | 5 | 0.83 |   | 3 | 0.30 | 1 |
| total | 1510 G | 2250 G | — | — | — | — | — | — | — | — | — | — | — | — | — |

As shown in Table 1, $P_{usage\ level}$ is 75.0% in a scenario of high usage rate. According to some embodiments of the present disclosure, both fs_2 and fs_8 have the largest $V_{size}/P_i$, while the latter has a larger $(V_{isnap}+V_{ifrag})/P_i$, so fs_8 will be selected to do auto shrink. There is no need to select any other file systems for further auto shrink since the $P_{fs\ usage}$ will rise to 1510/(2250−100)=70.2% after fs_8 is shrunk. Further, after the auto shrink of file system fs_8 $P_{usage\ level}$ will fall below 75%, so will switch to the scenario of medium usage rate.

TABLE 3

Parameter Values of File systems at t = 4.5H

| PID | $P_{usage\ level}$ | $P_{fs\ usage}$ | n |
|---|---|---|---|
| pool_1 | 76.7% | 68.7% | 10 |

TABLE 4

Parameter Values of File systems at t = 4.5 H

| FS | $US_i$ | $AS_i$ | $Shrk_i$ | $Snap_i$ | $Frag_i$ | $X_{shrink}$ | $X_{ishrink}$ | $V_{isize}$ | $X_{snap}$ | $X_{isnap}$ | $V_{isnap}$ | $X_{frag}$ | $X_{ifrag}$ | $V_{ifrag}$ | $P_i$ |
|---|---|---|---|---|---|---|---|---|---|---|---|---|---|---|---|
| fs_0 | 100 G | 150 G | 25 G | 5 | 20% | 8 | 2 | 0.25 | 6 | 5 | 0.83 | 10 | 8 | 0.80 | 1 |
| fs_1 | 100 G | 170 G | 40 G | 3 | 15% |   | 5 | 0.63 |   | 6 | 1.00 |   | 10 | 1.00 | 2 |
| fs_2 | 230 G | 350 G | 100 G | 10 | 30% |   | 8 | 1.00 |   | 1 | 0.17 |   | 5 | 0.50 | 1 |
| fs_3 | 100 G | 160 G | 40 G | 3 | 24% |   | 5 | 0.63 |   | 6 | 1.00 |   | 6 | 0.60 | 1 |
| fs_4 | 80 G | 110 G | 20 G | 3 | 60% |   | 1 | 0.13 |   | 6 | 1.00 |   | 1 | 0.10 | 3 |
| fs_5 | 110 G | 150 G | 20 G | 10 | 34% |   | 1 | 0.13 |   | 1 | 0.17 |   | 4 | 0.40 | 1 |
| fs_6 | 170 G | 230 G | 30 G | 6 | 51% |   | 3 | 0.38 |   | 4 | 0.67 |   | 2 | 0.20 | 2 |
| fs_7 | 180 G | 300 G | 80 G | 8 | 23% |   | 6 | 0.75 |   | 3 | 0.50 |   | 7 | 0.70 | 1 |
| fs_8 | 380 G | 500 G | 90 G | 9 | 19% |   | 7 | 0.88 |   | 2 | 0.33 |   | 9 | 0.90 | 2 |
| fs_9 | 130 G | 180 G | 35 G | 5 | 38% |   | 4 | 0.50 |   | 5 | 0.83 |   | 3 | 0.30 | 1 |
| total | 1580 G | 2300 G | — | — | — | — | — | — | — | — | — | — | — | — | — |

Example 2

Users create a storage pool of 3 TB and allocate the storage space to 10 file systems. At a certain time t=3H, some parameter values of the storage pool are as shown in the above Table 1 and some parameter value of file systems are as shown in the above Table 2. Similar to Example 1, the file system fs_8 is selected to do auto shrink of storage space.

However, during the auto shrink of file system fs_8, an extension on the file system fs_8 is triggered, which causes the auto shrink mentioned above to be canceled, thus punishment value $P_i$ of the file system fs_8 is increased by 1. After the file system fs_8 completes the extending, the $P_{usage\ level}$ is still in a scenario of high usage rate.

Some parameter values of the file systems and the storage pool are kept monitored 1.5 hours later. At time t=4.5H, some parameter values of the storage pool are shown as following in Tables 3, and some parameter values of the file systems are shown as following in Table 4.

Compared with Table 1, the $P_{usage\ level}$ and $P_{fs\ usage}$ in Table 3 have changed. Compared with Table 2, the $US_i$, $AS_i$, and $P_i$ of the file system fs_8 in Table 4 have changed, which results in changes in the values of $X_{shrink}$, $X_{ishrink}$, and $V_{isize}$. As shown in Table 3 above, $P_{usage\ level}$ is changed to 76.7%. According to some embodiments of the present disclosure, only file system fs_2 will be selected since it has the largest $V_{isize}/P_i$ and the $P_{fs\ usage}$ will rise to 1580/(2300−100)=71.8% after it is shrunk. Furthermore, after the auto shrink of the file system fs_2, $P_{usage\ level}$ will fall below 75%, so will switch to a scenario of medium usage rate.

Per the Examples 1 and 2 above, only one appropriate file system needs to perform the auto shrink to release from space sensitive status and would not introduce unnecessary performance impact to users product workloads. In addition, the embodiment of the present disclosure is smarter, more efficient and is able to adapt to the space management of an actual storage pool.

Figure 6:
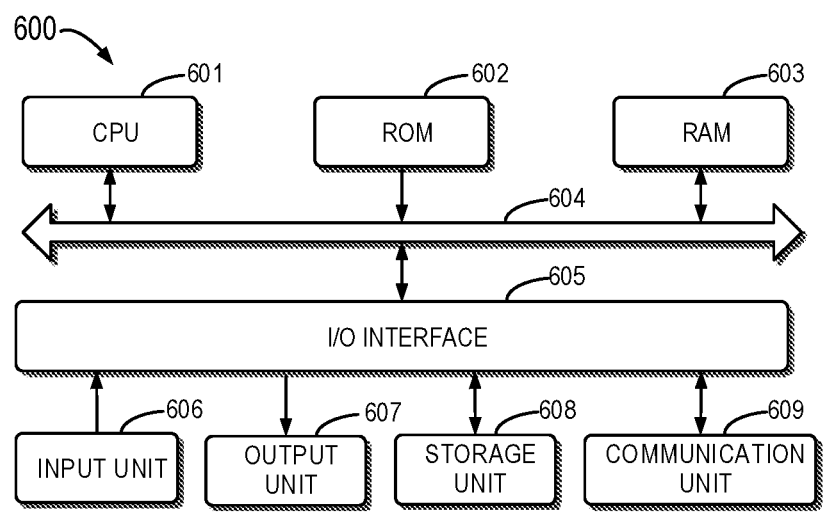
FIG. 6 is a block diagram illustrating a device that can be used to implement embodiments of the present disclosure.

FIG. 6 is a block diagram illustrating an example device 600 used to implement embodiments of the present disclosure. The device 600 may be a device or an apparatus described in the embodiments of the present disclosure. As shown in FIG. 6, the device 600 includes a central processing unit (CPU) 601 that may perform various appropriate actions and processes based on computer program instructions stored in a read-only memory (ROM) 602 or computer program instructions loaded from a storage unit 608 to a random access memory (RAM) 603. In the RAM 603, there further stores various programs and data needed for operations of the device 600. The CPU 601, ROM 602 and RAM 603 are connected to each other via a bus 604. An input/output (I/O) interface 605 is also connected to the bus 604.

The following components in the device 600 are connected to the I/O interface 605: an input 606 such as a keyboard, a mouse and the like; an output unit 607 including various kinds of displays and a loudspeaker, etc.; the storage unit 608 including a magnetic disk, an optical disk, and etc.; a communication unit 609 including a network card, a modem, and a wireless communication transceiver, etc. The communication unit 609 allows the device 600 to exchange information/data with other devices through a computer network such as the Internet and/or various kinds of telecommunications networks.

Various processes and processing described above, may be executed by the processing unit 601. For example, in some embodiments, the methods may be implemented as a computer software program that is tangibly embodied on a machine-readable medium, e.g., the storage unit 608. In some embodiments, part or all of the computer programs may be loaded and/or mounted onto the device 600 via the ROM 602 and/or communication unit 609. When the computer program is loaded to the RAM 603 and executed by the CPU 601, one or more steps as described above may be executed.

In some embodiments, methods and processes described above may be implemented as a computer program product. The computer program product may include a computer-readable storage medium having computer-readable program instructions thereon for causing a processor to carry out aspects of the present disclosure.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein may be downloaded to respective computing/processing devices from a computer-readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer readable storage medium within the respective computing/processing device.

Computer-readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language and conventional procedural programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet service provider). In some embodiments, electronic circuitry including, for example, programmable journal logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present disclosure.

These computer-readable program instructions may be provided to a processor of a general purpose computer, special purpose computer, or other programmable data processing apparatus to produce a machine, such that the instructions, which execute via the processor of the computer or other programmable data processing apparatus, create means (e.g., specialized circuitry) for implementing the functions/acts specified in the flowchart and/or block diagram block or blocks. These computer-readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams illustrate the architecture, functionality, and operation of possible implementations of devices, methods and computer program products according to various embodiments of the present disclosure. In this regard, each block in the flowchart or block diagrams may represent a module, snippet, or portion of code, which includes one or more executable instructions for implementing the specified journal logic function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method for shrinking a storage space, comprising:
   determining a used storage space in a storage pool allocated to a plurality of file systems;
   determining a usage level of a storage space in the storage pool based on the used storage space and a storage capacity of the storage pool; and
   shrinking a storage space from one or more of the plurality of file systems based on the usage level of the storage pool;
   wherein shrinking the storage space from one or more of the plurality of file systems comprises:
      in accordance with a determination that the usage level exceeds a first threshold and is below a second threshold, enabling a first file system of the plurality of file systems to:
      determine whether a first idle rate of a storage space of the first file system exceeds a first file system threshold; and
      in accordance with a determination that the first idle rate exceeds the first file system threshold, shrink a part of the storage space of the first file system.

2. The method of claim 1, wherein determining the used storage space in the storage pool allocated to the plurality of file systems comprises:
   determining the used storage space in the storage pool periodically; and
   obtaining a shrinkable space size, a number of snapshots, and a fragment level of each of the plurality of file systems.

3. The method of claim 1, further comprising:
   in accordance with a second determination that the usage level is below or equal to the first threshold, disabling an auto shrink function of storage space of all of the plurality of file systems.

4. The method of claim 3, further comprising:
   in accordance with a third determination that the usage level exceeds or is equal to the second threshold, selecting one or more file systems from the plurality of file systems for shrinking storage space.

5. The method of claim 4, wherein selecting one or more file systems from the plurality of file systems for shrinking storage space comprises:
   determining a shrinkable space size of each of the plurality of file systems; and
   selecting the one or more from the plurality of file systems based on a shrinkable space size of each file system.

6. The method of claim 5, wherein selecting the one or more file systems from the plurality of file systems comprises:
   in accordance with a determination that shrinkable space sizes of two or more file systems are equal, determining the number of snapshots of each of the two or more file systems; and
   selecting, based on the number of snapshots of each file system, one file system from the two or more file systems to perform space shrinking.

7. The method of claim 6, wherein selecting the one file system from the two or more file systems comprises:
   in accordance with a determination that shrinkable space sizes of the two or more file systems are equal, determining a fragment level of each of the two or more file systems; and
   selecting, based on the number of snapshots and a fragment level of each file system, one file system from the two or more file systems to perform space shrinking.

8. The method of claim 7, further comprising:
   determining whether an auto shrink operation of the selected file system is canceled; and
   in accordance with a determination that the auto shrink operation of the selected file system is cancelled, reducing a probability that the selected file system is selected again for auto shrinking.

9. The method of claim 7, further comprising:
   determining whether a usage rate of storage space of the plurality of file systems is below a predetermined threshold after the selected file system completes space shrink; and
   in accordance with a determination that the usage rate of the storage space of the plurality of file systems is below the predetermined threshold, continuing to shrink a storage space from another file system in the plurality of file systems.

10. The method of claim 1, wherein shrinking the storage space further comprises:
    determining that the usage level exceeds the first threshold and is below the second threshold.

11. The method of claim 1, where the first threshold is a first predefined percentage of an overall usage rate;
    where the second threshold is a second predefined percentage of the overall usage rate; and
    wherein determining the usage level of the storage space comprises:
       deriving, as a current usage rate for comparison with the first and second predefined percentages, a current usage percentage.

12. An electronic device, comprising:
    a processing unit; and
    a memory coupled to the processing unit and storing instructions, the instructions, when executed by the processing unit, causing the device to perform acts comprising:
       determining a used storage space in a storage pool allocated to a plurality of file systems;
       determining a usage level of a storage space in the storage pool based on the used storage space and a storage capacity of the storage pool; and shrinking a storage space from one or more of the plurality of file systems based on the usage level of the storage pool;

wherein shrinking the storage space from one or more of the plurality of file systems comprises:

in accordance with a determination that the usage level exceeds the first threshold and is below a second threshold, enabling a first file system of the plurality of file systems to:

determine whether a first idle rate of a storage space of the first file system exceeds a first file system threshold; and in accordance with a determination that the first idle rate exceeds the first file system threshold, shrink a part of the storage space of the first file system.

13. The device of claim 12, wherein determining the used storage space in the storage pool allocated to the plurality of file systems comprises:

determining the used storage space in the storage pool periodically; and obtaining a shrinkable space size, a number of snapshots, and a fragment level of each of the plurality of file systems.

14. The device of claim 12, the acts further comprising:

in accordance with a second determination that the usage level is below or equal to the first threshold, disabling an auto shrink function of storage space of all of the plurality of file systems.

15. The device of claim 14, further comprising:

in accordance with a third determination that the usage level exceeds or is equal to the second threshold, selecting one or more file systems from the plurality of file systems for shrinking storage space.

16. The device of claim 15, wherein selecting one or more file systems from the plurality of file systems for shrinking storage space comprises:

determining a shrinkable space size of each of the plurality of file systems; and selecting the one or more file systems from the plurality of file systems based on a shrinkable space size of each file system.

17. The device of claim 16, wherein selecting the one or more file systems from the plurality of file systems comprises:

in accordance with a determination that shrinkable space sizes of two or more file systems are equal, determining the number of snapshots of each of the two or more file systems; and selecting, based on the number of snapshots of each file system, one file system from the two or more file systems to perform space shrinking.

18. The device of claim 17, wherein selecting the one file system from the two or more file systems comprises:

in accordance with a determination that shrinkable space sizes of the two or more file systems are equal, determining a fragment level of each of the two or more file systems; and selecting, based on the number of snapshots and a fragment level of each file system, one file system from the two or more file systems to perform space shrinking.

19. The device of claim 18, the acts further comprising:

determining whether an auto shrink operation of the selected file system is canceled; and in accordance with a determination that the auto shrink operation of the selected file system is cancelled, reducing a probability that the selected file system is selected again for auto shrinking.

20. The device of claim 18, the acts further comprising:

determining whether a usage rate of storage space of the plurality of file systems is below a predetermined threshold after the selected file system completes space shrink; and in accordance with a determination that the usage rate of the storage space of the plurality of file systems is below the predetermined threshold, continuing to shrink a storage space from another file system in the plurality of file systems.

21. A computer program product having a non-transitory computer readable medium which stores a set of instructions to shrink a storage space; the set of instructions, when carried out by computerized circuitry, causing the computerized circuitry to perform a method of:

determining a used storage space in a storage pool allocated to a plurality of file systems;

determining a usage level of a storage space in the storage pool based on the used storage space and a storage capacity of the storage pool; and shrinking a storage space from one or more of the plurality of file systems based on the usage level of the storage pool;

wherein shrinking the storage space from one or more of the plurality of file systems comprises:

in accordance with a determination that the usage level exceeds a first threshold and is below a second threshold, enabling a first file system of the plurality of file systems to:

determine whether a first idle rate of a storage space of the first file system exceeds a first file system threshold; and in accordance with a determination that the first idle rate exceeds the first file system threshold, shrink a part of the storage space of the first file system.

* * * * *